US009022701B2

(12) United States Patent
Dunant-Chatellet et al.

(10) Patent No.: US 9,022,701 B2
(45) Date of Patent: May 5, 2015

(54) TOOL HOLDER INCLUDING COOLING MEANS

(75) Inventors: Clement Dunant-Chatellet, Antony (FR); Bruno Thomas, Paris (FR)

(73) Assignee: European Aeronautic Defence and Space Company EADS France, Paris (FR)

( * ) Notice: Subject to any disclaimer, the term of this patent is extended or adjusted under 35 U.S.C. 154(b) by 948 days.

(21) Appl. No.: 13/131,952

(22) PCT Filed: Nov. 25, 2009

(86) PCT No.: PCT/EP2009/065855
§ 371 (c)(1),
(2), (4) Date: Nov. 16, 2011

(87) PCT Pub. No.: WO2010/060936
PCT Pub. Date: Jun. 3, 2010

(65) Prior Publication Data
US 2012/0067544 A1  Mar. 22, 2012

(30) Foreign Application Priority Data
Nov. 28, 2008  (FR) ...................... 08 58125

(51) Int. Cl.
*B23B 51/06* (2006.01)
*B23B 31/02* (2006.01)
*B23Q 11/10* (2006.01)

(52) U.S. Cl.
CPC ............... *B23Q 11/10* (2013.01); *B23B 31/02* (2013.01); *B23B 2250/12* (2013.01)

(58) Field of Classification Search
USPC .............. 408/56, 57, 58, 59, 60, 61; 407/11; 409/135, 136; 279/20
See application file for complete search history.

(56) References Cited

U.S. PATENT DOCUMENTS

| 3,047,208 | A | * | 7/1962 | Coanda .................. 417/174 |
|---|---|---|---|---|
| 3,880,354 | A | | 4/1975 | Van Horn |
| 3,908,510 | A | * | 9/1975 | Koskolos et al. ............ 409/182 |
| 4,513,538 | A | | 4/1985 | Wolters et al. |
| 4,573,836 | A | * | 3/1986 | Andersson ................ 408/59 |
| 4,795,292 | A | * | 1/1989 | Dye ....................... 409/136 |
| 5,402,938 | A | | 4/1995 | Sweeney |
| 6,382,887 | B1 | * | 5/2002 | Nakai ..................... 409/136 |
| 7,134,812 | B2 | * | 11/2006 | Beckington .............. 408/56 |
| 7,226,251 | B2 | * | 6/2007 | Janson ................... 408/1 R |
| 2004/0191013 | A1 | * | 9/2004 | Sugata et al. ............ 408/57 |

FOREIGN PATENT DOCUMENTS

DE  33 06 246 A1  8/1984

OTHER PUBLICATIONS

International Search Report, dated Feb. 18, 2010, from corresponding PCT application.

* cited by examiner

*Primary Examiner* — Eric A Gates
*Assistant Examiner* — Paul M Janeski
(74) *Attorney, Agent, or Firm* — Young & Thompson

(57) ABSTRACT

Device for cooling a rotating tool mounted on a machine, including elements for generating a continually renewed first flow of air, external to the tool and around the tool, at a high flow rate, produced via a Coanda-effect flow amplifier device realized in a housing fixed on the machine around the tool holder connected to a source of pressurized air.

16 Claims, 2 Drawing Sheets

TOOL HOLDER INCLUDING COOLING MEANS

Figure 1:
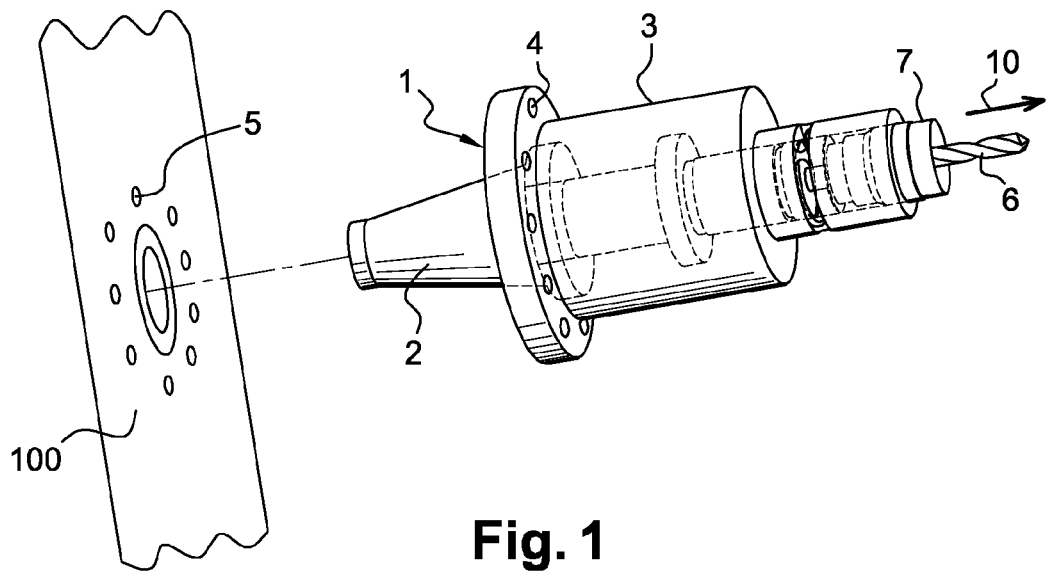

The present invention relates to a tool holder comprising means of cooling, notably by blowing air.

It is known to cool cutting or drilling tools during their use.

The cooling must be performed at the tool in order to reduce the temperatures reached at the tool contributing to phenomena of damage to the tool under the combination of forces resulting from its introduction into the matter, and chips sticking on the flutes and/or rim contributing to the phenomenon of chip packing.

This cooling of the tool must also help reduce the temperature of the chip, which will split more easily the colder it is, thus also contributing to a further reduction of the phenomenon of chip packing.

Currently, the cooling of the tools is realized by the use of an oil, a mixture of oil and air that can be in the form of oil mist, or by blowing dry air through means embedded in the constituent elements of the system for attaching the tool onto a tool holder.

However, for materials that have a low specific heat and are poor conductors, such as composites with an organic matrix or hard metals, steels or titanium alloy, the blowing of dry air is not sufficient to control the temperature levels coming from the tool's friction with the materials. It is necessary to reduce the temperature several hundred degrees in order to perform the operation without damaging the material in operating conditions that are safe, notably by avoiding the risk of ignition, and economically acceptable.

It should be noted that the blowing of dry air in the center of the tool has not been shown to be sufficiently effective in the machining of hard materials such as titanium alloys, inconel, composites with an organic matrix or others, due their low thermal conductivity.

Circulating air via the lubrication channels would not be a viable cooling solution due to the limitation in the diameter of the lubrication holes for a given tool diameter, so that the maximum output fluid flow rate is limited by the geometry of the channels.

This feature of heat not being conducted by the material results in heat being stored in the tool, a storage partly responsible for wear to the tool, the rise in the tool's temperature, and also damage to the tool, presenting an operating danger such as the tool breaking, due to thermal stresses that are too great, or ignition of the machined material.

There is therefore a need to lower the temperature of the tool by several hundred degrees to release the calories present in the tool.

It is also with a view to increasing productivity that the temperature must be reduced.

The need is therefore to remove the heat stored in the tool during its operational phase by a means embedded in the constituent elements of its attachment system. This removal of energy in the form of heat must occur at the level of the tool in its entirety so as to bring down the cutting temperatures of tools, which are mainly responsible for wear phenomena such as the hot scattering of the material's atoms in the tool's materials and vice versa or cutting problems such as the hot sticking of chips in the flutes and/or on the rims, responsible for chip packing.

To provide sufficient cooling in the context of dry machining the present invention provides for the use of a Coanda-effect flow amplifier.

The Coanda effect is based on the following premise: when a flowing fluid encounters an obstacle, it follows the surface before detaching itself with a trajectory different from that which it had beforehand. This property is used to drive a large volume of fluid from a source of fluid at high pressure.

Document U.S. Pat. No. 5,402,938 gives an example of realization of a Coanda-effect flow amplifier.

In this context, the present invention proposes a device for cooling a rotating tool mounted on a machine, the device comprising means for generating a continually renewed first flow of air, external to the tool and around the tool, at a high flow rate, produced via a Coanda-effect flow amplifier device realized in a housing fixed on the machine around the tool holder connected to a source of pressurized air.

The source of pressurized air is preferably the pressurized air network of the workshop in which the machine is located.

Preferably the flow amplification is performed on ambient air sucked in through openings formed in the housing.

According to an advantageous embodiment, the housing comprises a fixed body receiving an end-piece shaped as a nozzle surrounding the tool.

Preferably the device comprises a means for adjusting the size of a groove between the fixed body and the end-piece designed to act on the amplification ratio of the input flow with respect to the output flow from the amplifier.

According to a supplementary or alternative particular embodiment, the device comprises means for delivering a fluid in channels internal to the tool, the delivery means comprising a passage in a rotary seal between the housing and the tool holder.

Preferably, the fluid passing through the rotary seal is distributed in the tool's lubrication channels and comes out at the lips of the tool.

The fluid delivery means comprise in particular a connector and a pass-through at the housing.

According to a first embodiment, the fluid is a second air flow that is advantageously drawn from the pressurized air network of the workshop in which the machine is located.

According to a second embodiment, the fluid is a phase transformation fluid, the vaporization of which is endothermic, delivered in the tool's lubrication channels in liquid form and vaporizing in the tool's flutes at the tip of the tool.

The fluid is preferably a fluorinated fluid and more specifically a methoxy-nonafluorobutane-based fluid.

Figure 2:
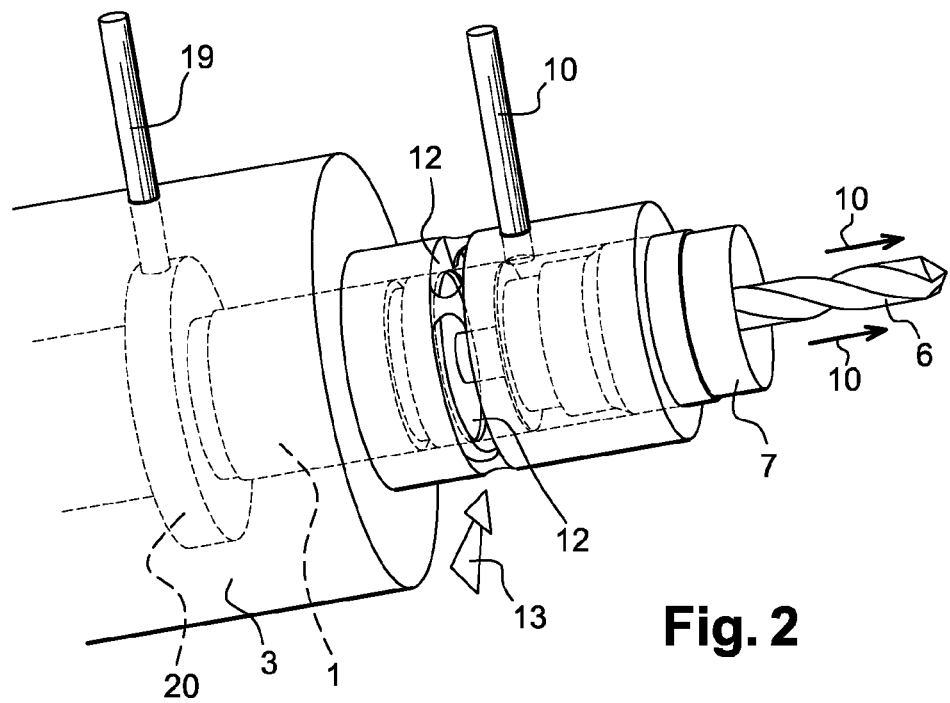
Figure 3:
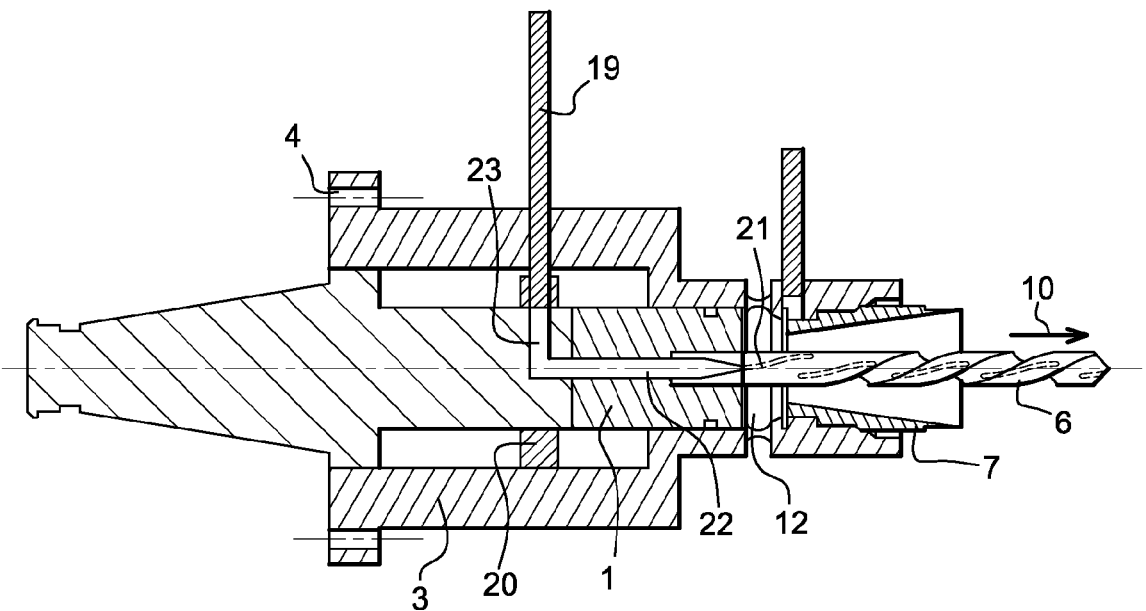
Figure 4:
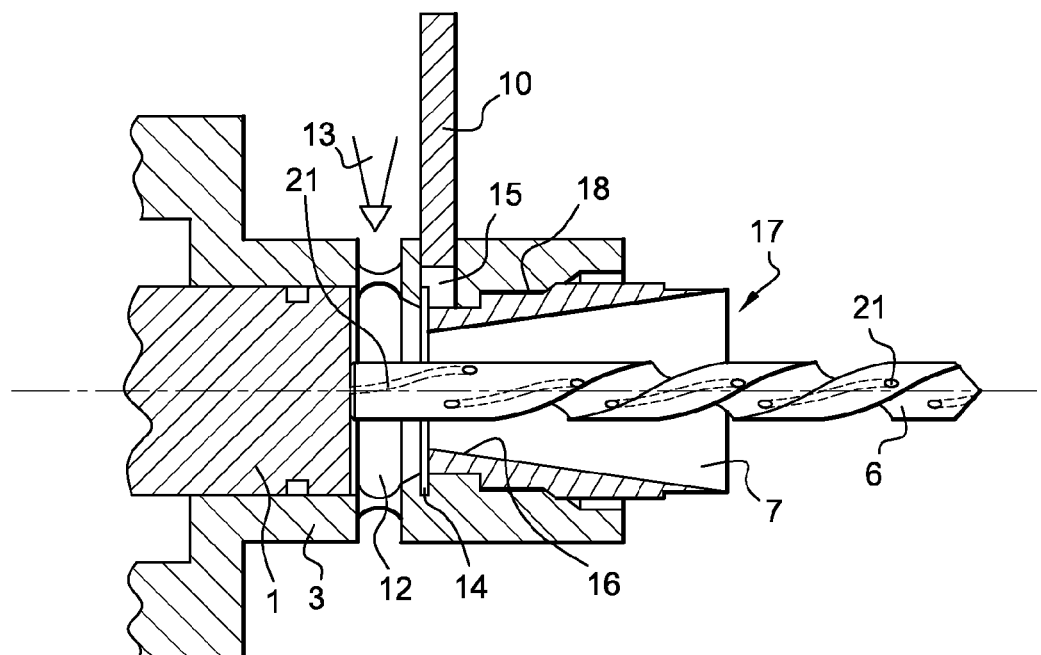

Other features and advantages of the invention will become apparent in reading the following description of a non-limiting example of realization of the invention with reference to the drawings, which show:

FIG. 1: a cut-away perspective view of a tool holder according to the invention, FIG. 2: a cut-away perspective view of an enlarged detail of the tool holder in FIG. 1, FIG. 3: a side view of the tool holder in FIG. 1, FIG. 4: an enlargement of a detail in FIG. 3.

The invention is described here in the context of a drilling mandrel tool holder but this principle can be used for cutting tools.

The tool holder 1 shown in FIG. 1 consists of a mandrel provided with a conical sleeve 2 for fitting into a device for driving a machining tool 100.

The tool holder is surrounded by a housing 3, shown in cut-away, provided with means 4 for receiving fixing means such as screws received in threaded holes 5 of the machine 100.

The tool 6 extends beyond the housing 3 by a front opening realized in an end-piece 7 mounted in the housing 3.

The device for cooling by blowing air of the invention comprises means for generating a continually renewed first flow of air 10, external to the tool and around the tool, at a high flow rate, produced via a Coanda-effect flow amplification device realized in the housing 3 fixed on the machine 100.

According to FIG. 2, the air flow 10 generated by the amplifier around the tool holder is generated from a source of pressurized air, notably the pressurized air network of the workshop in which the machine is located, linked by a pipe 11 connected to the housing at the flow amplifier.

The flow amplification is performed on ambient air 13 sucked in through openings 12 formed in the housing.

The flow amplifier enlarged in FIG. 4 is formed by means of a groove 14 between a compressed air inlet chamber 15 and the inner wall 16 of the end-piece 7 shaped as a nozzle, the internal section of which is conical and tapers towards the tip of the tool 6.

The end-piece 7 is received in a fixed body of the housing 3 around the tool 6.

For the working of the Coanda amplifier, it is necessary to refer to the aforementioned document U.S. Pat. No. 5,402,938 bearing in mind that the low pressure created at the radius of curvature between the inner wall 16 and the groove 14 sucks in the ambient air through the openings 12, a high air flow being obtained at the outlet 17 of the end-piece 7.

The device comprises a means for adjusting the size of the groove 14 between the fixed body and the end-piece designed to act on the amplification ratio of the input flow with respect to the output flow from the amplifier. This adjustment means is for example threading 18 between the end-piece and body of the housing 3, which allows the end-piece to be inserted more or less deeply into the body.

Thus, according to the invention, the flow amplifier is supplied by the compressed air of the plant to which it is connected and by sucking in the ambient air.

The flow amplifier is fully integrated into the housing around the tool holder and is as close as possible to the tool to allow optimum regeneration of the air.

The amplifier uses the plant's compressed air to create low pressure through the arrival of pressurized air in the circular groove 14; this causes low pressure in the center of the amplifier that leads to ambient air being sucked in.

Thus it is the combining of these two air flows that allows the amplifier's output flow rate to be increased with respect to its input rate.

As a supplement to the means for generating the first flow of air, the device according to the example comprises means for delivering a second flow of air in channels internal to the tool, the delivery means comprising a compressed air passage in a rotary seal 20 between the housing 3 and the tool holder 1 as shown in FIG. 3.

The compressed air is distributed in the tool's lubrication channels 211, for example by radial channels 23 then a longitudinal channel 22 and comes out the lips of the tool.

The means of delivering the second flow of air also comprises a connector 19 and a pass-through at the housing opening into the rotary seal 20 and the second air flow is drawn from the pressurized air network of the workshop in which the machine is located.

The amplifier will be operated continuously when the tool is driven in a rotational and/or translational movement, either when it is out of the material, to obtain full cooling of the tool between two machining operations, or in the material, which makes it possible to obtain cooling of the tool body, chips and cutting environment.

Added to this cooling effect is an effect of cleaning the tool's work area.

In effect, blowing air at high speed allows the chips to be flushed out and thus potentially avoid having them jammed at the tool/machining area interface.

It also allows the machined material to be kept at a low temperature, consequently limiting potential changes in the microstructure of the material.

The operator only has to start up the compressed air at the start of the machining cycle and switch it off at the end of the cycle.

There are 2 types of potential uses for this system.

The first is for reducing the temperature of the tool and its environment thus making it possible to reduce damage to the tool/machined material pair, decrease the phenomena of chip packing on the tool and eject chips from the work area so as to prevent jamming or scratching of these in the cutting area. The second is for improving processing productivity by increasing the tool's speeds (circumferential and/or translational) within the material, an increase possible because of the lower temperature obtained by means of the device of the invention.

This cooling principle will find its application in all manufacturing processes using a rotary tool that operates in a material likely to create heating by friction of a tool on a material.

The reduction in temperature provided by the invention also has the advantage of reducing the temperature of the chips which, colder, are more rigid and therefore can be broken up more easily, which reduces the risks of chip packing.

The air flow amplifier of the invention also makes it possible to reduce the risks of chips jamming and sticking due to the air flow's high pressure generated by it, which allows the chips to be released during drilling and between holes. The invention is particularly suitable in the context of dry machining, that is to say without lubricant, and allows better resistance to wear to be obtained for cutting tools in use.

In the case in which a phase transformation fluid, the vaporization of which is endothermic, is used, the fluid is injected liquid at the delivery means comprising the connector 19, the pass-through at the housing opening into the rotary seal 20 between the housing 3 and the tool holder 1 as shown in FIG. 3.

The fluid is distributed in the tool's lubrication channels 211, for example by radial channels 23 then a longitudinal channel 22 and comes out the lips of the tool. Under the heating due to the operation of the tool, the fluid vaporizes at the tip of the tool and absorbs the heat.

This cooling means is used for local cooling of the tip of the tool and the tool body.

It is advantageously completed by the flow amplifier device which thus has the main effect of cleaning the work area, in particular by blowing the chips.

Depending on the materials machined, either one or other or both cooling devices combined can be considered.

The invention claimed is:

1. A cooling device for cooling a rotating tool mounted on a tool holder that is rotatably mounted on a machine, comprising a Coanda-effect flow amplifier realized in a housing fixed on the machine around the tool holder and connected to an external source of pressurized air for generating a continually renewed first flow of air, external to the tool and around the tool, at a high flow rate wherein the Coanda-effect flow amplifier comprises through openings formed in the housing for pulling in ambient air and is designed to perform a flow amplification on ambient air pulled in by said pressurized air through said openings formed in the housing.

2. The cooling device according to claim 1 wherein the source of a pressurized air is a pressurized air network of a workshop in which the machine is located.

3. The cooling device according to claim 2 wherein the flow amplification is performed on ambient air sucked in through openings formed in the housing.

4. The cooling device according to claim 2 wherein the housing comprises a fixed body receiving an end-piece shaped as a nozzle surrounding the tool.

5. The cooling device according to claim 2 comprising means for delivering a fluid in channels internal to the tool.

6. The cooling device according to claim 1 wherein the housing comprises a fixed body receiving an end-piece shaped as a nozzle surrounding the tool.

7. The cooling device according to claim 6 wherein it comprises a means for adjusting the size of a groove between the fixed body and the end-piece designed to act on an amplification ratio of an input flow with respect to an output flow from the amplifier.

8. The cooling device according to claim 1 comprising means for delivering a fluid in channels internal to the tool, the delivery means comprising a passage in a rotary seal between the housing and the tool holder.

9. The cooling device according to claim 8 comprising means for distributing the fluid passing through the rotary seal in lubrication channels of the tool and wherein said fluid comes out at lips of the tool.

10. The cooling device according to claim 9 wherein the fluid delivery means comprise a connector and a pass-through at the housing.

11. The cooling device according to claim 8 wherein said means for delivering a fluid comprise a connector and a pass-through at the housing.

12. The cooling device according to claim 8 wherein the fluid is a second air flow.

13. The cooling device according to claim 12 wherein the second air flow is drawn from a pressurized air network of a workshop in which the machine is located.

14. The cooling device according to claim 8 wherein the fluid is a phase transformation fluid, the vaporization of which is endothermic.

15. The cooling device according to claim 14 wherein the fluid is a fluorinated fluid.

16. The cooling device according to claim 15 wherein the fluid is a methoxy-nonafluorobutane-based fluid.

* * * * *